US006733961B1

(12) United States Patent
Budz et al.

(10) Patent No.: US 6,733,961 B1
(45) Date of Patent: May 11, 2004

(54) HIGH CHLORIDE EMULSIONS WITH OPTIMIZED DIGITAL RECIPROCITY CHARACTERISTICS

(75) Inventors: Jerzy A. Budz, Fairport, NY (US); Eric L. Bell, Webster, NY (US); Jess B. Hendricks, III, Rochester, NY (US); Jerzy Z. Mydlarz, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/328,493

(22) Filed: Dec. 23, 2002

(51) Int. Cl.[7] ............................ G03C 1/09; G06F 17/00

(52) U.S. Cl. ....................... 430/569; 430/502; 430/567; 345/418

(58) Field of Search ................................ 430/569, 502, 430/567; 345/418

(56) References Cited

U.S. PATENT DOCUMENTS

| | | | | | |
|---|---|---|---|---|---|
| 5,284,745 | A | | 2/1994 | Ohshima | 430/569 |
| 5,360,712 | A | | 11/1994 | Olm et al. | 430/567 |
| 5,457,021 | A | | 10/1995 | Olm et al. | 430/567 |
| 5,462,849 | A | | 10/1995 | Kuromoto et al. | 430/567 |
| 5,470,771 | A | | 11/1995 | Fujii et al. | 437/43 |
| 5,474,888 | A | | 12/1995 | Bell | 430/567 |
| 5,500,335 | A | | 3/1996 | Bell | 430/567 |
| 5,547,827 | A | | 8/1996 | Chen et al. | 430/567 |
| 5,549,879 | A | | 8/1996 | Chow | 423/491 |
| 5,550,013 | A | | 8/1996 | Chen et al. | 430/567 |
| 5,597,686 | A | | 1/1997 | MacIntyre et al. | 430/567 |
| 5,605,789 | A | | 2/1997 | Chen et al. | 430/567 |
| 5,618,660 | A | * | 4/1997 | Fujiwara et al. | 430/567 |
| 5,726,005 | A | | 3/1998 | Chen et al. | 430/567 |
| 5,728,516 | A | | 3/1998 | Edwards et al. | 430/567 |
| 5,736,310 | A | | 4/1998 | Chen et al. | 430/567 |
| 5,783,372 | A | | 7/1998 | Budz et al. | 430/363 |
| 5,783,373 | A | | 7/1998 | Mydlarz et al. | 430/363 |
| 5,783,378 | A | | 7/1998 | Mydlarz et al. | 430/567 |
| 5,792,601 | A | | 8/1998 | Edwards et al. | 430/567 |
| 5,962,210 | A | | 10/1999 | Hahm et al. | 430/567 |
| 6,048,683 | A | | 4/2000 | Mehta et al. | 430/567 |
| 6,242,172 | B1 | | 6/2001 | Budz et al. | 430/567 |

OTHER PUBLICATIONS

Research Disclosure No. 437013; titled “Color Paper With Exceptional Reciprocity Performance”; Disclosed Anonymously; Sep. 2000; pp. 1522–1549.

* cited by examiner

*Primary Examiner*—Hoa Van Le
(74) *Attorney, Agent, or Firm*—Andrew J. Anderson

(57) ABSTRACT

A method for forming a radiation-sensitive high chloride silver halide emulsion is described comprising growing cubical silver halide grains having a central portion accounting for up to 98 percent of total silver of the grains which central portion contains an iridium coordination complex dopant, and chemically sensitizing the surface of the emulsion grains at a pH of at least 5.75. Localized addition of the known in the art reciprocity-controlling iridium dopants to an internal portion of the emulsion grains and chemical finishing of such an emulsion at elevated pH conditions improves reciprocity and latent image stability of the formed high chloride emulsions.

30 Claims, No Drawings

HIGH CHLORIDE EMULSIONS WITH OPTIMIZED DIGITAL RECIPROCITY CHARACTERISTICS

FIELD OF THE INVENTION

This invention is directed to radiation sensitive high chloride silver halide emulsions useful in photography, including electronic printing methods wherein information is recorded in a pixel-by-pixel mode in a radiation silver halide emulsion layer, comprising iridium complex dopants located at specific sites in the emulsion grains and spectrally and chemically sensitized at relatively high pH.

DEFINITION OF TERMS

The term "high chloride" in referring to silver halide grains and emulsions indicates that chloride is present in a concentration of greater than 50 mole percent, based on total silver. In referring to grains and emulsions containing two or more halides, the halides are named in order of ascending concentrations.

The term "cubic grain" is employed to indicate a grain is that bounded by six {100} crystal faces. Typically the corners and edges of the grains show some rounding due to ripening, but no identifiable crystal faces other than the six {100} crystal faces. The six {100} crystal faces form three pairs of parallel {100} crystal faces that are equidistantly spaced.

The term "cubical grain" is employed to indicate grains that are at least in part bounded by {100} crystal faces satisfying the relative orientation and spacing of cubic grains. That is, three pairs of parallel {100} crystal faces are equidistantly spaced. Cubical grains include both cubic grains and grains that have one or more additional identifiable crystal faces. For example, tetradecahedral grains having six {100} and eight {111} crystal faces are a common form of cubical grains.

The term "central portion" in referring to cubical silver halide grains refers to that portion of the grain structure that is first precipitated accounting for up to 98 percent of total precipitated silver required to form the {100} crystal faces of the grains.

The term "dopant" is employed to indicate any material within the rock salt face centered cubic crystal lattice structure of a silver halide grain other than silver ion or halide ion.

The term "dopant band" is employed to indicate the portion of the grain formed during the time that dopant was introduced to the grain during precipitation process.

The term "normalized" molar addition rate hereinafter assigned the symbol $R_n$ is a measure of the intensity of rate of addition of silver salt solution to the reaction vessel in case of a double-jet precipitation process. $R_n$ is defined by the formula:

$$R_n=Q_f C_f/M$$

where $Q_f$ is the volumetric rate (liters/min) of addition of silver salt solution into the reaction vessel, $C_f$ is the molar concentration (moles/liter) of the said solution, and M is total moles of silver halide host grains in the reaction vessel at the precise moment of above addition.

All references to the periodic table of elements periods and groups in discussing elements are based on the Periodic Table of Elements as adopted by the American Chemical Society and published in the *Chemical and Engineering*

*News*, Feb. 4, 1985, p. 26. The term "Group VIII" is used to generically describe elements in groups 8, 9 and 10.

The term "log E" is the logarithm of exposure in lux-seconds.

Photographic speed is reported in relative log units and therefore referred to as relative log speed. 1.0 relative log speed unit is equal to 0.01 log E.

The term "contrast" or "γ" is employed to indicate the slope of a line drawn from stated density points on the characteristic curve.

The term "reciprocity law failure" refers to the variation in response of an emulsion to a fixed light exposure due to variation in the specific exposure time.

*Research Disclosure* is published by Kenneth Mason Publications, Ltd., Dudley House, 12 North St., Emsworth, Hampshire P010 7DQ, England.

BACKGROUND OF THE INVENTION

In its most commonly practiced form silver halide photography employs a film in a camera to produce, following photographic processing, a negative image on a transparent film support. A positive image for viewing is produced by exposing a photographic print element containing one or more silver halide emulsion layers coated on a reflective white support through the negative image in the camera film, followed by photographic processing. In a relatively recent variation negative image information is retrieved by scanning and stored in digital form. The digital image information is later used to expose imagewise the emulsion layer or layers of the photographic print element.

Whereas high bromide silver halide emulsions are the overwhelming commercial choice for camera films, high chloride cubic grain emulsions are the overwhelming commercial choice for photographic print elements. It is desired in high chloride emulsions for color paper applications to obtain high photographic speed at the desired curve shape.

Many known imaging systems require that a hard copy be provided from an image which is in digital form. A typical example of such a system is electronic printing of photographic images which involves control of individual pixel exposure. Such a system provides greater flexibility and the opportunity for improved print quality in comparison to optical methods of photographic printing. In a typical electronic printing method, an original image is first scanned to create a digital representation of the original scene. The data obtained is usually electronically enhanced to achieve desired effects such as increased image sharpness, reduced graininess and color correction. The exposure data is then provided to an electronic printer which reconstructs the data into a photographic print by means of small discrete elements (pixels) that together constitute an image. In a conventional electronic printing method, the recording element is scanned by one or more high energy beams to provide a short duration exposure in a pixel-by-pixel mode using a suitable source such as a cathode ray tube (CRT), light emitting diode (LED) or laser. Such methods are described in the patent literature, including, for example, Hioki U.S. Pat. No. 5,126,235; European Patent Application 479 167 A1 and European Patent Application 502 508 A1. Also, many of the basic principles of electronic printing are provided in Hunt, *The Reproduction of Color*, Fourth Edition, pages 306–307, (1987).

Reciprocity characteristics, usually referred to as reciprocity failure, are measured in terms of departures from the law of photographic reciprocity. The exposure (E) of a photographic element is the product of the intensity (I) of exposure multiplied by its duration (time):

$$E=I\times\text{time}$$

According to the photographic law of reciprocity, a photographic element should produce the same image with the same exposure, even though exposure intensity and time are varied . For example, an exposure for $1/100^{th}$ of a second at a selected intensity should produce exactly the same result as an exposure of $10^{-5}$ second at an intensity that is increased by a factor of $10^{-3}$. When photographic performance is noted to diverge from the reciprocity law, this is known as reciprocity failure.

A very typical observation in examining high chloride emulsions for photographic print applications is that the upper scale of photographic curve (also referred to as shoulder) falls off as the intensity of exposure increases and its time decreases. It has become increasing clear that with the continuing development of a variety of high intensity digital printing devices that photographic print materials with performance invariant to exposure time is increasingly important. When exposure times are reduced below one second to very short intervals (e.g., $10^{-5}$ second or less), higher exposure intensities must be employed to compensate for the reduced exposure times. High intensity reciprocity failure (hereinafter also referred to as HIRF) occurs when photographic performance is noted to depart from the reciprocity law when such shorter exposure times are employed. Print materials which traditionally suffer speed or contrast losses at short exposure times (high intensity exposures) will fail to reproduce detail with high resolution. Text will appear blurred. Through-put of digital print devices will suffer as well. Accordingly, print materials with reduced HIRF are desired in order to produce excellent photographic prints in a wide variety of digital printers.

The use of dopants in silver halide grains to modify photographic performance is generally illustrated by *Research Disclosure*, Item 38957, cited above, I. Emulsion grains and their preparation, D. Grain modifying conditions and adjustments, paragraphs (3)–(5). Photographic performance attributes known to be affected by dopants include sensitivity, reciprocity failure, and contrast. Using empirical techniques, e.g., the art has over the years identified many dopants capable of increasing photographic speed. Keevert et al U.S. Pat. No. 4,945,035, e.g., was the first to teach the incorporation of a hexacoordination complex containing a transition metal and cyano ligands as a dopant in high chloride grains to provide increased sensitivity. Careful scientific investigations have revealed Group VIII hexahalo coordination complexes, on the other hand, to create electron traps, effective for increasing contrast, as illustrated R. S. Eachus, R. E. Graves and M. T. Olm *J. Chem. Phys.*, Vol. 69, pp. 4580–7 (1978) and *Physica Status Solidi A*, Vol. 57,429–37 (1980) and R. S. Eachus and M. T. Olm *Annu. Rep. Prog. Chem. Sect. C. Phys. Chem.*, Vol. 83, 3, pp. 3–48 (1986).

Doping with iridium, including iridium hexachloride complexes, is commonly performed to reduce reciprocity law failure in silver halide emulsions. The use of iridium coordination complex dopants containing at least one organic ligand has also been proposed. Specific iridium dopants include those illustrated in high chloride emulsions by Bell U.S. Pat. Nos. 5,474,888, 5,470,771 and 5,500,335 and McIntyre et al U.S. Pat. No. 5,597,686; those disclosed in Olm et al U.S. Pat. Nos. 5,360,712 and 5,457,021; Kuromoto et al U.S. Pat. No. 5,462,849; Mydlarz et al U.S. Pat. Nos. 5,783,373 and 5,783,378; Hahm et al U.S. Pat. No. 5,962,210. Specific combinations of iridium and other metal dopants may additionally be found in U.S. Pat. Nos. 4,828, 962, 5,153,110, 5,219,722, 5,227,286, 5,229,263, and 6,107, 018, and European Patent Applications EP 0 244 184, EP 0 405 938, EP 0 476 602, EP 0 488 601, EP 0 488 737, EP 0 513 748, and EP 0 514 675.

Another typical effect that can be measured for high chloride emulsion is its latent image stability in the time interval between actual exposure and the time when image is developed. It is desired that the resulting photographic speed is not subject to change within that time, such that the photographic response is not significantly impacted by any delay in development after exposure. The speed change measured for 10 second to 5 minutes time interval is often referred to as the Short Term Latent Image Keeping (SLIK). While iridium dopants have been found useful for improving high intensity reciprocity performance, they have also been found to contribute to undesired SLIK speed changes in high chloride emulsions resulting in positive density changes due to processing delays. In order to increase the output of digital printing devices, such as CRT, LED, or laser-based printers, it would be highly desirable to be able to employ iridium dopants in high chloride emulsions in order to reduce HIRF and thereby increase the shoulder of high chloride silver halide emulsion sensitometric curve shapes when exposed at very short times, while maintaining a minimal SLIK speed change.

U.S. Pat. No. 5,284,745 suggests the use of relatively high pH during chemical sensitization of silver chlorobromide emulsions comprising grains having silver bromide localized phases on or near the surface of the grains in order to reduce density losses observed due to long term (e.g., 72 hours) processing delays. The patent discloses the incorporation of iridium with the silver bromide localized phases at or near the grain surfaces, but fails to teach or suggest the impact of high pH sensitization for emulsions containing iridium in a central portion of the emulsions grains.

PROBLEM TO BE SOLVED BY THE INVENTION

Accordingly, a current challenge in the manufacture of photographic materials, and in particular color photographic print materials such as photographic color paper, is to develop high chloride silver halide emulsions with good photographic sensitivity while controlling the reciprocity and short term latent image characteristics. Such enhanced sensitivity emulsions would be usefull to build specific photographic elements that would perform equally well at long time and short time flash exposures of traditional color print materials, as well as extremely short time pixel-by-pixel exposures of digital printing devices. However, while improving emulsion digital reciprocity difficulties in maintaining short term latent image keeping are often encountered. While it is typically the blue color record that has the greatest need for short term latent image keeping and reciprocity improvement in the art of silver chloride-based color paper preparation, improvements in red and green color records would also be advantageous.

It is thus an objective of the present invention to provide high chloride emulsions with desired reciprocity and SLIK characteristics. A further objective of certain embodiments of the invention is to provide color papers that have improved photographic response regardless of the imagewise exposure they have received. A still further objective of certain embodiments of the invention is to improve the efficiency of the method of electronic printing using pixel-by-pixel digital short time exposures.

SUMMARY OF THE INVENTION

In one aspect this invention is directed towards a method for forming a radiation-sensitive high chloride silver halide emulsion comprising growing cubical silver halide grains having a central portion accounting for up to 98 percent of total silver of the grains which central portion contains an iridium coordination complex dopant, and chemically sensitizing the surface of the emulsion grains at a pH of at least 5.75. In a preferred embodiment, the invention is particularly useful for the preparation of radiation-sensitive cubical silver halide grain emulsions which contain from 0.05 to 3 mole percent iodide, based on total silver, wherein (i) the iodide is incorporated in the grains in a controlled, non-uniform distribution forming a core containing at least 50 percent of total silver, an iodide free surface shell having a thickness of greater than 50 A, and a sub-surface shell that contains a maximum iodide concentration, and (ii) the iridium coordination complex dopant is incorporated into the sub-surface shell or into a region of the core extending up to 60% of the total silver into the grain from the sub-surface shell.

In further aspects, this invention is directed towards emulsions obtained by the above method, as well as photographic recording elements comprising a support and at least one light sensitive silver halide emulsion layer comprising sensitized silver halide grains as described above.

In another aspect, this invention is directed to an electronic printing method which comprises subjecting a radiation sensitive silver halide emulsion layer of a recording element to actinic radiation of at least $10^{-4}$ ergs/$cm^2$ for up to 100 $\mu$ seconds duration in a pixel-by-pixel mode, wherein the silver halide emulsion layer is comprised of sensitized silver halide grains as described above.

The advantages of the invention are generally accomplished in accordance with the discovery that reciprocity and latent image stability of high chloride emulsions can be improved by localized addition of the known in the art reciprocity-controlling iridium dopants to an internal portion of the emulsion grains and chemical finishing of such an emulsion at elevated pH conditions. By carefully incorporating reciprocity-controlling dopant and controlling chemical finishing pH the difficulties of the prior art can be overcome.

In a preferred practical application, the advantages of the invention can be transformed into increased throughput of digital artifact-free color print images while exposing each pixel sequentially in synchronism with the digital data from an image processor.

DESCRIPTION OF PREFERRED EMBODIMENTS

The cubical silver halide grains precipitated in accordance with the invention contain greater than 50 mole percent chloride, based on silver. Preferably the grains contain at least 70 mole percent chloride and, optimally at least 90 mole percent chloride, based on silver. Silver bromide and silver chloride are miscible in all proportions. Hence, any portion of the total halide not accounted for chloride can be bromide. While it has been common practice to avoid or minimize the incorporation of iodide into high chloride grains employed in color paper, it has been recently observed that silver iodochloride cubical grains can offer exceptional levels of photographic speed where iodide is incorporated in such emulsion gains in a profiled manner. Overall iodide concentration for such emulsions is thus preferably from 0.05 to 3 mole percent, more preferably 0.1 to 1 mole percent, based on silver. For color reflection print (i.e., color paper) uses bromide is typically limited to less than 10 mole percent based on silver and iodide is preferably limited to less than 1 mole percent based on silver.

In accordance with certain embodiments of the emulsions of the invention, iodide may be added onto core portions of the high chloride grains to create a silver iodochloride shell on the host (core) grains. Attempts to use these shelled grains in photographic print elements without further modification results in markedly inferior performance. Having high iodide concentrations at the surface of the grains lowers speed as compared to the emulsions satisfying the requirements of the invention when both emulsions are sensitized to the same minimum density and otherwise produces elevated levels of minimum density that are incompatible with acceptable performance characteristics of photographic reflective print elements. To increase speed and lower minimum density an iodide-free shell may be precipitated onto the silver iodochloride shell, converting it into a sub-surface shell. The depth to which sub-surface shell is buried is chosen to render the iodide in the sub-surface shell inaccessible to the developing agent at the outset of development of latent image bearing grains and inaccessible throughout development in the grains that do not contain a latent image. The thickness of the surface shell is contemplated to be greater than 50 Å in emulsions employed in reflection print photographic elements. The surface shell thickness can, of course, range up to any level compatible with the minimum core requirement of 50 (preferably 85) percent of total silver for such embodiment of the invention. Since the sub-surface shell can contribute as little as 0.05 mole percent iodide, based on total silver, it is apparent that surface shells can account for only slightly less than all of the silver not provided by the core portions of the grains. A surface shell accounting for just less than 50 (preferably just less than 15) percent of total silver is specifically contemplated. Whereas it might be thought that shifting the maximum iodide phase to the interior of the grain would also shift the latent image internally, detailed investigations have revealed that latent image formation for such silver iodochloride emulsions remains at the surface of the grams.

It was initially observed that, after starting with monodisperse silver chloride cubic grains (i.e., grains consisting of six {100} crystal faces), iodide introduction produced tetradecahedral grains (i.e., grains consisting of six {100} crystal faces and eight {111} crystal faces). Further investigations revealed that as few as one {111} crystal face are sometimes present in the completed grains. On still further investigation, it has been observed that the silver iodochloride emulsions can be cubic grain emulsions. Thus, although the presence of at least one {111} crystal face (and usually tetradecahedral grains) provides a convenient visual clue that the grains may have been prepared with a sub-surface silver iodochloride shell, it has now been concluded that one or more {111} crystal faces are a by-product of grain formation that can be eliminated or absent without compromising the performance advantages of such emulsions.

The preparation of cubical grain silver iodochloride emulsions with iodide placements that produce increased photographic sensitivity in accordance with certain embodiments of the invention can be undertaken by employing any convenient conventional high chloride cubical grain precipitation procedure prior to precipitating the region of maximum iodide concentration—that is, through the introduction of at least the first 50 (preferably at least the first 85) percent of silver precipitation. The initially formed high chloride cubical grains may then serve as hosts for further grain growth. In one specifically contemplated preferred form the host emulsion is a monodisperse silver chloride cubic grain emulsion. Low levels of iodide and/or bromide, consistent with the overall composition requirements of the grains, can also be tolerated within the host grains. The host grains can include other cubical forms, such as tetradecahedral forms. Techniques for forming emulsions satisfying the host grain requirements of the preparation process are well known in the art. For example, prior to growth of the maximum iodide concentration region of the grains, the precipitation procedures of Atwell U.S. Pat. No. 4,269,927, Tanaka EPO 0 080 905, Hasebe et al U.S. Pat. No. 4,865,962, Asami EPO 0 295 439, Suzunoto et al U.S. Pat. No. 5,252,454 or Ohshima et al U.S. Pat. No. 5,252,456, the disclosures of which are here incorporated by reference, can be employed, but with those portions of the preparation procedures, when present, that place bromide ion at or near the surface of the grains being omitted. Stated another way, the host grains can be prepared employing the precipitation procedures taught by the citations above through the precipitation of the highest chloride concentration regions of the grains they prepare. The rate at which silver nitrate and sodium chloride are added into the reactor can be at any practical "normalized" molar addition rate range, including low ($R_n$ less than or equal to 0.03 $min^{-1}$) and high ($R_n$ greater than 0.03 $min^{-1}$) addition rates.

Once a host grain population has been prepared accounting for at least 50 percent (preferably at least 85 percent) of total silver has been precipitated, an increased concentration of iodide may be introduced into the emulsion to form a region of the gains containing a maximum iodide concentration The iodide ion is preferably introduced as a soluble salt, such as an ammonium or alkali metal iodide salt. The iodide ion can be introduced concurrently with the addition of silver and/or chloride ion. Alternatively, the iodide ion can be introduced alone followed promptly by silver ion introduction with or without further chloride ion introduction. As an alternative source of iodide ions, the fine silver iodide grains of a Lippmann emulsion can be ripened out as disclosed anonymously in *Research Disclosure*, Vol. 531, May 1998, item 40928. Still another approach, recently advocated, illustrated by Royster et al in U.S. Pat. No. 5,866,314, is to add iodide as dimethylamine silver chloroiodide complex. It is preferred to grow the maximum iodide concentration region on the surface of the host grains rather than to introduce a maximum iodide concentration region exclusively by displacing chloride ion adjacent the surfaces of the host grains.

To maximize the localization of crystal lattice variances produced by iodide incorporation it is preferred that the iodide ion be introduced as rapidly as possible. That is, the iodide ion forming the maximum iodide concentration region of the grains is preferably introduced in less than 30 seconds, optimally in less than 10 seconds. When the iodide is introduced more slowly, somewhat higher amounts of iodide (but still within the ranges set out above) are required to achieve speed increases equal to those obtained by more rapid iodide introduction and minimum density levels are somewhat higher. Slower iodide additions are manipulatively simpler to accomplish, particularly in larger batch size emulsion preparations. Hence, adding iodide over a period of at least 1 minute (preferably at least 2 minutes) and, preferably, during the concurrent introduction of silver is specifically contemplated.

The rate at which silver salt and halide salt solutions may be added to create an outer shell after iodide addition can be at any practical "normalized" molar addition rate range, including low ($R_n$ less than or equal to 0.03 $min^{-1}$) and high ($R_n$ greater than 0.03 $min^{-1}$) addition rates. Where the reaction vessel contains excess halide ions, the silver salt solution may be added by itself to precipitate the outer shell. It is preferred, however, to simultaneously introduce a halide salt solution into the dispersing medium with the silver salt solution. High normalized molar silver addition rates after iodide addition are disclosed by Mehta et al in U.S. Pat. No. 6,265,145, the disclosure of which is incorporated by reference herein. Chen et. al. in U.S. Pat. No. 5,547,827; Chen et. al. in U.S. Pat. No. 5,550,013; Chen et. al. in U.S. Pat. No. 5,605,789; Chen et. al. in U.S. Pat. No. 5,726,005; Edwards et. al. in U.S. Pat. No. 5,728,516; Chen et. al. in U.S. Pat. No. 5,736,310; Budz et. al. in U.S. Pat. No. 5,783,372 and Edwards et. al. in U.S. Pat. No. 5,792,601 additionally disclose highly sensitive silver iodochloride cubical emulsions with low levels of iodide located in the exterior portions of the grains.

At the conclusion of grain precipitation the grains can take varied cubical forms, ranging from cubic grains (bounded entirely by six {100} crystal faces), grains having an occasional identifiable {111} face in addition to six {100} crystal faces, and, at the opposite extreme tetradecahedral grains having six {100} and eight {111} crystal faces.

After examining the performance of emulsions exhibiting varied cubical grain shapes, it has been concluded that the performance of high chloride emulsion grains containing a subsurface silver iodochloride shell is principally determined by iodide incorporation and the uniformity of grain size dispersity. The silver iodochloride grains are relatively monodisperse. The silver iodochloride grains preferably exhibit a grain size coefficient of variation of less than 35 percent and optimally less than 25 percent. Much lower grain size coefficients of variation can be realized, but progressively smaller incremental advantages are realized as dispersity is minimized.

In accordance with the invention, iridium coordination complex dopants are incorporated into a central portion which comprises up to 98 percent of total silver of the high chloride emulsion grains which is first precipitated during formation of the face centered cubic crystal lattice of the emulsion grains. The iridium coordination complex dopant preferably is an iridium coordination complex having ligands each of which are more electropositive than a cyano ligand. It is specifically contemplated to select iridium coordination complex dopants including one or more organic ligands as disclosed by Olm et al U.S. Pat. No. 5,360,712, Olm et al U.S. Pat. No. 5,457,021 and Kuromoto et al U.S. Pat. No. 5,462,849, the disclosures of which are here incorporated by reference. The iridium dopant preferably contains at least one thiazole or substituted thiazole ligand. The thiazole ligands may be substituted with any photographically acceptable substituent which does not prevent incorporation of the dopant into the silver halide grain. Exemplary substituents include lower alkyl (e.g., alkyl groups containing 1–4 carbon atoms), and specifically methyl. A specific example of a substituted thiazole ligand which may be used in accordance with the invention is 5-methylthiazole. In a specifically preferred form the remaining non-thiazole or non-substituted-thiazole ligands of the iridium coordination complex dopants are halide ligands.

In a preferred form it is contemplated to employ as the iridium dopant a hexacoordination complex satisfying the formula:

$$[IrL_6]^n$$

wherein n is zero, −1, −2, −3 or −4; and $L_6$ represents six bridging ligands which can be independently selected, provided that at least four of the ligands are anionic ligands. Preferably, each of the ligands is more electropositive than a cyano ligand, and at least one of the ligands comprises a thiazole or substituted thiazole ligand. Any remaining ligands can be selected from among various other bridging ligands, including aquo ligands, halide ligands (specifically, fluoride, chloride, bromide and iodide), cyanate ligands, thiocyanate ligands, selenocyanate ligands, tellurocyanate ligands, and azide ligands. In a specifically preferred form at least four of the ligands are halide ligands, such as chloride or bromide ligands. Useful neutral and anionic organic ligands for dopant hexacoordination complexes are also disclosed by Olm et al U.S. Pat. No. 5,360,712 and Kuromoto et al U.S. Pat. No. 5,462,849, incorporated by reference above.

When the iridium coordination complex dopants have a net negative charge, it is appreciated that they are associated with a counter ion when added to the reaction vessel during precipitation. The counter ion is of little importance, since it is ionically dissociated from the dopant in solution and is not incorporated within the grain. Common counter ions known to be fully compatible with silver chloride precipitation, such as ammonium and alkali metal ions, are contemplated.

The following are specific illustrations of dopants capable of use in the invention:

$[IrCl_5(thiazole)]^{-2}$ $[IrCl_4(thiazole)_2]^{-1}$ $[IrBr_5(thiazole)]^{-2}$ $[IrBr_4(thiazole)_2]^{-1}$ $[IrCl_5(5\text{-methylthiazole})]^{-2}$ $[IrCl_4(5\text{-methylthiazole})_2]^{-1}$ $[IrBr_5(5\text{-methylthiazole})]^{-2}$ $[IrBr_4(5\text{-methylthiazole})_2]^{-1}$ $[IrCl_6]^{-2}$ $[IrBr_6]^{-2}$ $[IrCl_6]^{-3}$ $[IrBr_6]^{-3}$ The iridium dopant is preferably introduced into the high chloride grains after at least 50 (most preferably 80 and optimally 85) percent of the silver has been precipitated, but before precipitation of 98 percent of the total silver (i.e., the central portion) of the grains has been completed. Preferably the iridium dopant is introduced before 97 pertcent and more preferably before 95 percent, of the silver has been precipitated. Stated in terms of the fully precipitated grain structure, the iridium dopant is preferably present in an interior shell region that surrounds at least 50 (most preferably 80 and optimally 85) percent of the silver and, with the more centrally located silver, accounts for the entire central portion (98 percent of the silver), more preferably accounts for 97 percent, and optimally accounts for 95 percent of the silver halide forming the high chloride grains. The iridium dopant can be distributed throughout the interior shell region delimited above or can be added as one or more bands within the interior shell region.

It has been recognized in U.S. Pat. No. 6,242,172 that heretofore unattained levels of sensitivity and other advantageous properties can be realized by the introduction of iridium-based dopants into high chloride emulsion grains which comprise a subsurface silver iodochloride shell as described above where the iridium dopant is introduced either prior to formation of the high iodide band or incorporated directly into the high iodide band. In accordance with certain embodiments of the invention, the iridium dopant is similarly introduced prior to formation of a high iodide band (within a region adjacent to the high iodide band and comprising up to 50% of the total silver into the emulsion grains, preferably up to 40% of the total silver, and most preferably up to 20% of the total silver), or incorporated into a high iodide band by introducing the dopant into the reaction vessel as a single-jet with iodide solution. Generally better results are obtained when the dopant is incorporated in the exterior 50 percent of the grain, based on silver. The dopant can be introduced all at once or run into the reaction vessel over a period of time while grain precipitation is continuing. In such embodiment, it is preferred to run dopant over a period of time, thus forming a dopant band within the grain.

The iridium dopants can be employed in the high chloride emulsions of the invention at any conventional useful concentration, and are generally used in an amount between $1\times10^{-10}$ and $1\times10^{-4}$ moles per silver mole. A preferred amount of the iridium is between $1\times10^{-9}$ and $1\times10^{-5}$ moles per silver mole, and more preferably between $1\times10^{-8}$ and $1\times10^{-6}$ moles per silver mole for best photographic performance.

The contrast of photographic elements containing high chloride silver halide emulsions of the invention can be further increased by doping the grains with a hexacoordination complex containing a nitrosyl or thionitrosyl ligand. Preferred coordination complexes of this type are represented by the formula:

$$[TE_4(NZ)E']^r$$

where

T is a Os or Ru;

E is a bridging ligand;

E' is E or NZ;

r is zero, −1, −2 or −3; and

Z is oxygen or sulfur.

The E ligands can take any of the forms found in the dopants. A listing of suitable coordination complexes satisfying the above formula is found in McDugle et al U.S. Pat. No. 4,933,272, the disclosure of which is here incorporated by reference.

Osmium and ruthenium dopants such as described in U.S. Pat. No. 5,830,631, the disclosure of which is hereby incorporated by reference, may also be used in the emulsions of the invention.

The emulsions can be prepared in any mean grain size known to be useful in photographic print elements. Mean grain sizes in the range of from 0.15 to 2.5 μm are typical, with mean grain sizes in the range of from 0.2 to 2.0 μm being generally preferred.

Once high chloride cubical grains having iridium dopant have been precipitated as described above, chemical and spectral sensitization, followed by the addition of conventional addenda to adapt the emulsion for the imaging application of choice can take any convenient conventional form, with the added requirement that chemical sensitization of the grain surface is performed at a pH of at least 5.75. These conventional features are illustrated, e.g., by *Research Disclosure*, Item 38957, cited above, particularly:

III. Emulsion washing;

IV. Chemical sensitization;

V. Spectral sensitization and desensitization;

VII. Antifoggants and stabilizers;

VIII. Absorbing and scattering materials;

IX. Coating and physical property modifying addenda; and

X. Dye image formers and modifiers.

As stated above, the emulsions of the invention are chemically sensitized at an elevated pH level (pH at least 5.75, preferably at least 6.0). Preferred chemical sensitizers include gold and sulfur chemical sensitizers. Typical of suitable gold and sulfur sensitizers are those set forth in Section IV of *Research Disclosure* 38957, September 1996. Preferred is colloid aurous sulfide such as disclosed in *Research Disclosure* 37154 for good speed and low fog. To avoid unintentional fogging, pH during chemical sensitization and other emulsion finishing procedures is preferably maintained below 9.0. By carefully incorporating reciprocity-controlling iridium dopant to an internal portion of the emulsion grains and controlling chemical finishing pH the advantages of the invention are generally accomplished in accordance with the discovery that reciprocity and latent image stability of high chloride emulsions are improved as demonstrated in the examples below, and the difficulties of the prior art are overcome.

Some additional silver halide, generally less than 5 percent and typically less than 1 percent, based on total silver, can be introduced to facilitate chemical sensitization. It is also recognized that silver halide can be epitaxially deposited at selected sites on a host grain to increase its sensitivity. For the purpose of providing a clear demarcation, the term "silver halide grain" is herein employed to include the silver necessary to form the grain up to the point that the final {100} crystal faces of the grain are formed. Silver halide later deposited that does not overlie the {100} crystal faces previously formed accounting for at least 50 percent of the grain surface area is excluded in determining total silver forming the silver halide grains. Thus, the silver forming selected site epitaxy is not part of the silver halide grains while silver halide that deposits and provides the final {100} crystal faces of the grains is included in the total silver forming the grains, even when it differs significantly in composition from the previously precipitated silver halide.

It is also possible to add dopants during emulsion finishing. It is preferred in the invention that an iridium complex additionally be added during finishing in order to produce a print material with good reciprocity performance. It is noted, however, that addition of iridium dopant only during finishing (i.e., and not added as a dopant during grain precipitation) is itself insufficient to realize the effect of the invention. The preferred iridium complex for addition during finishing is an iridium hexachloride compound, which is preferably added in an amount between 0.0001 and 1.0 mg/silver mole, more preferably between 0.001 and 0.1 mg/silver mole, for best photographic performance. In accordance with a particular embodiment of the invention, it is specifically contemplated to add additional iridium dopants to an emulsion of the invention during finishing with epitaxially deposited silver bromide after an iodide sub-surface shell has been formed by the addition of AgI seeds as described in U.S. Pat. No. 6,248,507 by Budz et al., the disclosure of which is incorporated by reference herein.

The emulsions can be spectrally sensitized in any convenient conventional manner. Spectral sensitization and the selection of spectral sensitizing dyes is disclosed, for example, in *Research Disclosure*, Item 38957, cited above, Section V. Spectral sensitization and desensitization. The emulsions used in the invention can be spectrally sensitized with dyes from a variety of classes, including the polymethine dye class, which includes the cyanines, merocyanines, complex cyanines and merocyanines (i.e., tri-, tetra- and polynuclear cyanines and merocyanines), styryls, merostyryls, streptocyanines, hemicyanines, arylidenes, allopolar cyanines and enamine cyanines. Combinations of spectral sensitizing dyes can be used which result in supersensitization—that is, spectral sensitization greater in some spectral region than that from any concentration of one of the dyes alone or that which would result from the additive effect of the dyes. Supersensitization can be achieved with selected combinations of spectral sensitizing dyes and other addenda such as stabilizers and antifoggants, development accelerators or inhibitors, coating aids, brighteners and antistatic agents. Any one of several mechanisms, as well as compounds which can be responsible for supersensitization, are discussed by Gilman, *Photographic Science and Engineering*, Vol. 18, 1974, pp. 418–430.

The emulsions are preferably protected against changes in fog upon aging. Preferred antifoggants can be selected from among the following groups:

A. A mercapto heterocyclic nitrogen compound containing a mercapto group bonded to a carbon atom which is linked to an adjacent nitrogen atom in a heterocyclic ring system, B. A quaternary aromatic chalcogenazolium salt wherein the chalcogen is sulfur, selenium or tellurium, C. A triazole or tetrazole containing an ionizable hydrogen bonded to a nitrogen atom in a heterocyclic ring system, or D. A dichalcogenide compound comprising an —X—X— linkage between carbon atoms wherein each X is divalent sulfur, selenium or tellurium.

The above groups of antifoggants are known in the art, and are described in more detail, e.g., in U.S. Pat. No. 5,792,601, the disclosure of which is incorporated by reference herein.

In the simplest contemplated form a recording element in accordance with the invention can consist of a single emulsion layer satisfying the emulsion description provided above coated on a conventional photographic support, such as those described in *Research Disclosure*, Item 38957, cited above, XVI. Supports. In one preferred form the support is a white reflective support, such as photographic paper support or a film support that contains or bears a coating of a reflective pigment. To permit a print image to be viewed using an illuminant placed behind the support, it is preferred to employ a white translucent support, such as a Duratrans™ or Duraclear™ support.

The invention can be used to form either silver or dye images in the recording element. In a simple form a single radiation sensitive emulsion layer unit is coated on the support. The emulsion layer unit can contain one or more high chloride silver halide emulsions satisfying the requirements of the invention, either blended or located in separate layers. When a dye imaging forming compound, such as a dye-forming coupler, is present in the layer unit, it can be present in an emulsion layer or in a layer coated in contact with the emulsion layer. With a single emulsion layer unit a monochromatic image is obtained.

It is, of course, recognized that the photographic elements of the invention can include more than one emulsion. Where more than one emulsion is employed, such as in a photographic element containing a blended emulsion layer or separate emulsion layer units, all of the emulsions can be high chloride emulsions as contemplated by this invention. Alternatively one or more conventional emulsions can be employed in combination with an emulsion of this invention. For example, a separate emulsion can be blended with an emulsion according to the invention to satisfy specific imaging requirements. For example, emulsions of differing speed are conventionally blended to attain specific aim photographic characteristics. Instead of blending emulsions, the same effect can usually be obtained by coating the emulsions that might be blended in separate layers. It is well known in the art that increased photographic speed can be realized when faster and slower emulsions are coated in separate layers with the faster emulsion layer positioned to receiving exposing radiation first. When the slower emulsion layer is coated to receive exposing radiation first, the result is a higher contrast image. Specific illustrations are provided by *Research Disclosure*, Item 36544, cited above Section I. Emulsion grains and their preparation, Subsection E. Blends, layers and performance categories.

The emulsion layers as well as optional additional layers, such as overcoats and interlayers, contain processing solution permeable vehicles and vehicle modifying addenda. Typically these layer or layers contain a hydrophilic colloid, such as gelatin or a gelatin derivative, modified by the addition of a hardener. Illustrations of these types of materials are contained in *Research Disclosure*, Item 36544, previously cited, Section II. Vehicles, vehicle extenders, vehicle-like addenda and vehicle related addenda. The overcoat and other layers of the photographic element can usefully include an ultraviolet absorber, as illustrated by *Research Disclosure*, Item 36544, Section VI. UV dyes/optical brighteners/luminescent dyes, paragraph (1). The overcoat, when present can usefully contain matting agents to reduce surface adhesion. Surfactants are commonly added to the coated layers to facilitate coating. Plasticizers and lubricants are commonly added to facilitate the physical handling properties of the photographic elements. Antistatic agents are commonly added to reduce electrostatic discharge. Illustrations of surfactants, plasticizers, lubricants and matting agents are contained in *Research Disclosure*, Item 36544, previously cited, Section IX. Coating physical property modifying addenda.

Preferably the photographic elements of the invention include a conventional processing solution decolorizable antihalation layer, either coated between the emulsion layer(s) and the support or on the back side of the support. Such layers are illustrated by *Research Disclosure*, Item 36544, cited above, Section VIII. Absorbing and Scattering Materials, Subsection B, Absorbing materials and Subsection C. Discharge.

A specific preferred application of the invention is in color photographic elements, particularly color print (e.g., color paper) photographic elements intended to form multicolor images. In multicolor image forming photographic elements at least three superimposed emulsion layer units are coated on the support to separately record blue, green and red exposing radiation. The blue recording emulsion layer unit is typically constructed to provide a yellow dye image on processing, the green recording emulsion layer unit is typically constructed to provide a magenta dye image on processing, and the red recording emulsion layer unit is typically constructed to provide a cyan dye image on processing Each emulsion layer unit can contain one, two, three or more separate emulsion layers sensitized to the same one of the blue, green and red regions of the spectrum. When more than one emulsion layer is present in the same emulsion layer unit, the emulsion layers typically differ in speed. Typically interlayers containing oxidized developing agent scavengers, such as ballasted hydroquinones or arninophenols, are interposed between the emulsion layer units to avoid color contamination. Ultraviolet absorbers are also commonly coated over the emulsion layer units or in the interlayers. Any convenient conventional sequence of emulsion layer units can be employed, with the following being the most typical:

| Typical Coating Structure 1 |
|---|
| Surface Overcoat |
| Ultraviolet Absorber |
| Red Recording Cyan Dye Image Forming Emulsion Layer Unit |
| Scavenger Interlayer |
| Ultraviolet Absorber |
| Green Recording Magenta Dye Image Forming Emulsion Layer Unit |
| Scavenger Interlayer |
| Blue Recording Yellow Dye Image Forming Emulsion Layer Unit |
| Reflective Support |

Further illustrations of this and other layers and layer arrangements in multicolor photographic elements are provided in *Research Disclosure*, Item 36544, cited above, Section XI. Layers and layer arrangements.

Each emulsion layer unit of the multicolor photographic elements contain a dye image forming compound. The dye image can be formed by the selective destruction, formation or physical removal of dyes. Element constructions that form images by the physical removal of preformed dyes are illustrated by *Research Disclosure*, Vol. 308, December 1989, Item 308119, Section VII. Color materials, paragraph H. Element constructions that form images by the destruction of dyes or dye precursors are illustrated by *Research Disclosure*, Item 36544, previously cited, Section X. Dye image formers and modifiers, Subsection A. Silver dye bleach. Dye-forming couplers are illustrated by *Research Disclosure*, Item 36544, previously cited, Section X. Subsection B. Image-dye-forming couplers. It is also contemplated to incorporate in the emulsion layer units dye image modifiers, dye hue modifiers and image dye stabilizers, illustrated by *Research Disclosure*, Item 36544, previously cited, Section X. Subsection C. Image dye modifiers and Subsection D. Hue modifiers/stabilization. The dyes, dye precursors, the above-noted related addenda and solvents (e.g., coupler solvents) can be incorporated in the emulsion layers as dispersions, as illustrated by *Research Disclosure*, Item 36544, previously cited, Section X. Subsection E. Dispersing and dyes and dye precursors.

Materials useful in the preparation of color papers are further illustrated by current commercial practice as, for example, by EDGE™, PORTRA™ or SUPRA™, Color Papers as sold by Eastman Kodak Company, by FUJI™ FA-family Color Papers and FUJI Type D Digital Paper as sold by Fuji Photo Film, by KONICA™ QA-family Color Papers as sold by Konishiroku Industries, by DURATRANS™ and DURACLEAR™ display films as sold by Eastman Kodak Company and by KONSENSUS-II™ display films as sold by Konishiroku Industries. It is also contemplated that the emulsion composition of the invention may be advantageously incorporated into the elements described in an article titled "Typical and Preferred Color Paper, Color Negative, and Color Reversal Photographic Elements and Processing," published in *Research Disclosure*, February 1995, Item 37038. The advantages of the current invention may be achieved by modifying any of these formulations to conform to the requirements set forth in the specification. The exact magnitude of the benefits achieved will, of course, depend on the exact details of the formulations involved but these will be readily apparent to the skilled practitioner.

Silver halide emulsions satisfying the requirements of the invention described above can be present in any one or combination of the emulsion layer units. Additional useful multicolor, multilayer formats for an element of the invention include Structures I–IV as described in U.S. Pat. No. 5,783,373 referenced above, which is incorporated by reference herein. Each of such structures in accordance with the invention would contain at least one silver halide emulsion comprised of high chloride grains as described above. In accordance with one particular embodiment, at least the blue-sensitized, yellow dye image-forming unit of such elements comprises such a high chloride emulsion. Preferably each of the emulsion layer units contain an emulsion satisfying these criteria.

Conventional features that can be incorporated into multilayer (and particularly multicolor) recording elements contemplated for use in the invention are also illustrated by *Research Disclosure*, Item 38957, cited above:

XI. Layers and layer arrangements

XII. Features applicable only to color negative

XIII. Features applicable only to color positive

B. Color reversal

C. Color positives derived from color negatives

XIV. Scan facilitating features.

The recording elements comprising the radiation sensitive high chloride emulsion layers according to this invention can be image-wise exposed in a pixel-by-pixel mode using suitable high energy radiation sources typically employed in electronic printing methods. In one further embodiment, the present invention is accordingly directed to an electronic printing method which comprises subjecting a radiation sensitive silver halide emulsion layer of a recording element to actinic radiation of at least $10^{-4}$ ergs/cm$^2$ for up to 100$\mu$ seconds duration in a pixel-by-pixel mode. The present invention realizes an improvement in reciprocity failure by modifying the radiation sensitive silver halide emulsion layer. While certain embodiments of the invention are specifically directed towards electronic printing, use of the emulsions and elements of the invention is not limited to such specific embodiment, and it is specifically contemplated that the emulsions and elements of the invention are also well suited for conventional optical printing.

Suitable actinic forms of energy for exposing light sensitive recording elements in accordance with the invention encompass the ultraviolet, visible and infrared regions of the electromagnetic spectrum as well as electron-beam radiation and is conveniently supplied by beams from one or more light emitting diodes or lasers, including gaseous or solid state lasers. Exposures can be monochromatic, orthochromatic or panchromatic. For example, when the recording element is a multilayer multicolor element, exposure can be provided by laser or light emitting diode beams of appropriate spectral radiation, for example, infrared, red, green or blue wavelengths, to which such element is sensitive. Multicolor elements can be employed which produce cyan, magenta and yellow dyes as a function of exposure in separate portions of the electromagnetic spectrum, including at least two portions of the infrared region, as disclosed in the previously mentioned U.S. Pat. No. 4,619,892, incorporated herein by reference. Suitable exposures include those up to 2000 nm, preferably up to 1500 nm. The exposing source need, of course, provide radiation in only one spectral region if the recording element is a monochrome element sensitive to only that region (color) of the electromagnetic spectrum. Suitable light emitting diodes and commercially available laser sources are described in the examples. Image-wise exposures at ambient, elevated or reduced temperatures and/or pressures can be employed within the useful response range of the recording element determined by conventional sensitometric techniques, as illustrated by T. H. James, *The Theory of the Photographic Process*, 4th Ed., Macmillan, 1977, Chapters 4, 6, 17, 18 and 23.

The quantity or level of high energy actinic radiation provided to the recording medium by the exposure source is generally at least $10^{-4}$ ergs/cm$^2$, typically in the range of about $10^{-4}$ ergs/cm$^2$ to $10^{-3}$ ergs/cm$^2$ and often from $10^{-3}$ ergs/cm$^2$ to $10^{-2}$ ergs/cm$^2$. Exposure of the recording element in a pixel-by-pixel mode as known in the prior art persists for only a very short duration or time. Typical maximum exposure times are up to 100$\mu$ seconds, often up to 10$\mu$ seconds, and frequently up to only 0.5$\mu$ seconds. Single or multiple exposures of each pixel are contemplated. The pixel density is subject to wide variation, as is obvious to those skilled in the art. The higher the pixel density, the sharper the images can be, but at the expense of equipment complexity. In general, pixel densities used in conventional electronic printing methods of the type described herein do not exceed $10^{-7}$ pixels/cm$^2$ and are typically in the range of about $10^{-4}$ to $10^{-6}$ pixels/cm$^2$. An assessment of the technology of high-quality, continuous-tone, color electronic printing using silver halide photographic paper which discusses various features and components of the system, including exposure source, exposure time, exposure level and pixel density and other recording element characteristics is provided in Firth et al., *A Continuous-Tone Laser Color Printer*, Journal of Imaging Technology, Vol. 14, No. 3, June 1988, which is hereby incorporated herein by reference. A description of some of the details of conventional electronic printing methods comprising scanning a recording clement with high energy beams such as light emitting diodes or laser beams, are set forth in Hioki U.S. Pat. No. 5,126,235, European Patent Applications 479 167 A1 and 502 508 A1, the disclosures of which are hereby incorporated herein by reference.

Once imagewise exposed, the recording elements can be processed in any convenient conventional manner to obtain a viewable image. Such processing is illustrated by *Research Disclosure*, Item 38957, cited above:

XVIII. Chemical development systems

XIX. Development

XX. Desilvering, washing, rinsing and stabilizing

The described elements can be also processed in the ionic separation imaging systems which utilize the sulfonamidonaphthol diffusion transfer technology. Such a photographic product comprises at least one image dye providing element comprising at least one layer of photosensitive silver halide emulsion with which is associated a non-diffusible image dye-providing substance. After image-wise exposure, a coating is treated with an alkaline processing composition in the presence of a silver halide developing agent in such a way that for each dye-image forming element, a silver image is developed. An image-wise distribution of oxidized developer cross-oxidizes the molecule of the image dye-providing compound. This, in an alkaline medium, cleaves to liberate a diffusible image dye. A preferred system of this type is disclosed in Fleckenstein U.S. trial voluntary protest document B351,637, dated Jan. 28, 1975. Other patents include: U.S. Pat. Nos. 4,450,224 and 4,463,080, and U.K. Patents 2,026,710 and 2,038,041.

In a similar technology, a silver halide photographic process is combined with LED exposure and thermal development/transfer resulting in a high image quality hard copy system incorporating digital exposure technology. Some of the many patents include U.S. Pat. Nos. 4,904,573; 4,952,969; 4,732,846; 4,775,613; 4,439,513; 4,473,631; 4,603,103; 4,500,626; 4,713,319.

The following examples illustrate the practice of this invention. They are not intended to be exhaustive of all possible variations of the invention. Parts and percentages are by weight unless otherwise specified.

EXAMPLES 1–8

Example 1 (comparison): To a reactor incorporating a stirring device as disclosed in *Research Disclosure*, Item 38213, and containing 8.84 kg of distilled water, 25 mg of p-glutaramidophenyl disulfide and 250 g of bone gelatin, were added 291 g of 3.8 M sodium chloride salt solution such that the mixture was maintained at a pCl of about 1.05 at approximately 68° C. To this were added 1.9 of 1,8-dihydroxy-3,6-dithiaoctane approximately 30 seconds before commencing introduction of silver and chloride salt solutions. Aqueous solutions of about 3.7 M silver nitrate and about 3.8 M sodium chloride were then added by conventional controlled double-jet addition at a constant silver nitrate flow rate of about 79.7 mL/min for about 1.71 minutes while maintaining pCl constant at about 1.05. Following this nucleation period the rest of silver nitrate and sodium chloride for growth of the 91% of the core grain were delivered with five pulses at the flow rate of about 232 mL/min separated by hold periods. Then both the silver and sodium salt solution pumps were then turned off and about 0.8 M potassium iodide solution was added to the stirred reaction mixture over about 30 seconds at a constant flow rate of about 62.9 mL/min. The resultant iodochloride emulsion was then grown further by pulsed controlled double-jet addition for about 1.5 minutes by resumed addition of silver and sodium salt solutions at about 223 mL/min at a pCl of about 1.05. In addition, cesium pentachloronitrosylosmate was added at approximately 4 to 70% into the precipitation, potassium hexacyanoruthenate at 75–80%, and iridium pentachloro-5-methylthiazole at 85–88.4% band before iodide addition. A silver iodochloride emulsion was thus prepared with 0.2 mole % iodide located at 91% of total grain volume. Cubic edge length was 0.61 μm.

A portion of this silver iodochloride emulsion was titrated until pH reached the value of 5.25, and then optimally sensitized by the addition of p-glutaramidophenyl disulfide followed by the addition of a colloidal suspension of aurous sulfide and heat ramped to 60° C. during which time blue sensitizing dye(Dye 1), potassium hexachloroiridate, Lippmann bromide, and 1-(3-acetamidophenyl)-5-mercaptotetrazole were added.

Dye 1

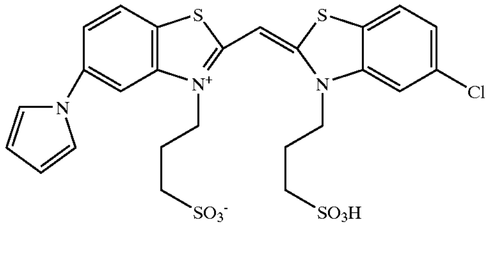

Example 2 (invention): Emulsion in this example was precipitated and optimally sensitized as in Example 1, with the following exception: pH was adjusted to 6.6 prior to start of chemical sensitization.

Example 3 (comparison): Emulsion in this example was precipitated as in Example 1, with the following exception: iridium pentachloro-5-methylthiazole amount was increased by 33%. A portion of this silver iodochloride emulsion was optimally sensitized as in Example 1.

Example 4 (invention): Emulsion in this example was precipitated as in Example 3, and was optimally sensitized as in Example 2.

Example 5 (comparison): Emulsion in this example was precipitated as in Example 1, with the following exceptions: iridium pentachloro-5-methylthiazole amount was decreased by 33% ant it was added at 87.5–89.5% band before iodide addition. A portion of this silver iodochloride emulsion was optimally sensitized as in Example 1.

Example 6 (invention): Emulsion in this example was precipitated as in Example 5, and was optimally sensitized as in Example 2.

Example 7 (comparison): Emulsion in this example was precipitated as in Example 1, with the following exception: iridium pentachloro-5-methylthiazole was added at 87.5–89.5% band before iodide addition. A portion of this silver iodochloride emulsion was optimally sensitized as in Example 1.

Example 8 (invention): Emulsion in this example was precipitated as in Example 7, and was optimally sensitized as in Example 2.

Color-negative imaging elements on reflective support were prepared using primarily lime-processed gelatins in the hydrophilic colloid layers thereof, except for the overcoat. The support was photographic grade paper resin coated with polyethylene on the front and back sides. The front-side resin layer on the support contained titanium dioxide, red and blue colorants, a fluorescent optical brightener, and antioxidants. In the coating structure, blue-sensitive imaging Layer 1 is the first layer of a three-color photographic recording material on the resin-coated paper support and comprised a dispersion of yellow coupler mixed with blue-sensitive chloro-iodide cubic emulsions from Examples 1–8 above. The subsequent layers comprised, in order, a layer containing a scavenger for oxidized developer, a green imaging layer, a second scavenger layer, a red imaging layer, a UV absorbing layer and a protective gelatin super-coat. The green imaging layer comprised a dispersion of magenta coupler mixed with a green-sensitive chloride cubic emulsion (0.3 μm average grain size) while a red-sensitized chloride emulsion (0.4 μm average grain size) was mixed with a dispersion of cyan couplers to form the red imaging layer. Details of the structure of the multilayer coating, including component coverages in each layer, arc shown below.

| Coating structure | |
|---|---|
| Layer 7 (Supercoat) | |
| Ludox AM ® (DuPont) | 0.1614 $g \cdot m^{-2}$ |
| Gelatin (acid-processed gelatin) | 0.6456 $g \cdot m^{-2}$ |
| Polydimethylsiloxane | 0.0202 $g \cdot m^{-2}$ |
| SF-1 | 0.0080 $g \cdot m^{-2}$ |
| SF-2 | 0.0033 $g \cdot m^{-2}$ |
| Layer 6 (UV Layer) | |
| Tinuvin-328 ® | 0.130 $g \cdot m^{-2}$ |
| Tinuvin 326 ® | 0.023 $g \cdot m^{-2}$ |
| DMBHQ | 0.042 $g \cdot m^{-2}$ |
| CS-3 | 0.051 $g \cdot m^{-2}$ |
| Gelatin | 0.525 $g \cdot m^{-2}$ |
| Layer 5 (Red-sensitive Layer) | |
| Ag | 0.176 $g \cdot m^{-2}$ |
| Coupler CC-1 | 0.245 $g \cdot m^{-2}$ |
| Tinuvin 328 ® | 0.338 $g \cdot m^{-2}$ |

-continued

| Coating structure | |
|---|---|
| CS-3 | 0.092 g · $m^{-2}$ |
| CS-4 | 0.460 g · $m^{-2}$ |
| Gelatin | 1.247 g · $m^{-2}$ |
| Layer 4 (Interlayer B) | |
| DMBHQ | 0.108 g · $m^{-2}$ |
| CS-6 | 0.162 g · $m^{-2}$ |
| St-6 | 0.016 g · $m^{-2}$ |
| Gelatin | 0.754 g · $m^{-2}$ |
| Layer 3 (Green-sensitive Layer) | |
| Ag | 0.105 g · $m^{-2}$ |
| Phenyl mercapto tetrazole | 0.001 g · $m^{-2}$ |
| Coupler MC-1 | 0.183 g · $m^{-2}$ |
| St-4 | 0.059 g · $m^{-2}$ |
| St-3 | 0.048 g · $m^{-2}$ |
| CS-5 | 0.323 g · $m^{-2}$ |
| CS-2 | 0.112 g · $m^{-2}$ |
| Gelatin | 1.187 g · $m^{-2}$ |
| Layer 2 (Interlayer A) | |
| DMBHQ | 0.129 g · $m^{-2}$ |
| CS-6 | 0.194 g · $m^{-2}$ |
| St-6 | 0.019 g · $m^{-2}$ |
| Gelatin | 0.904 g · $m^{-2}$ |
| Layer 1 (Blue-sensitive Layer) | |
| Ag | 0.217 g · $m^{-2}$ |
| Coupler YC-1 | 0.414 g · $m^{-2}$ |
| St-1 | 0.080 g · $m^{-2}$ |
| St-4 | 0.080 g · $m^{-2}$ |
| St-5 | 0.080 g · $m^{-2}$ |
| CS-1 | 0.218 g · $m^{-2}$ |
| HQ-K | 0.0095 g · $m^{-2}$ |
| MHR | 0.0011 g · $m^{-2}$ |
| Gelatin | 1.011 g · $m^{-2}$ |
| Hardener | 0.125 g · $m^{-2}$ |

Resin layer: polyethylene and titanium dioxide, red and blue colorants, fluorescent optical brightener, antioxidants
Paper Support
Resin layer: polyethylene
antistatic layer MHR = 2,5-dihydroxy-5-methyl-3-(4-morpholinyl)-2-cyclopenten-1-one
HQ-K = 2,5-dihydroxy-4-(1-methylheptadecyl)-benzenesulphonic acid (K salt)
DMBHQ = 2,5-di-(1,1,3,3-tetramethylbutyl) hydroquinone
Hardener = bis(vinylsulphonyl) methane (BVSM)

SF-1

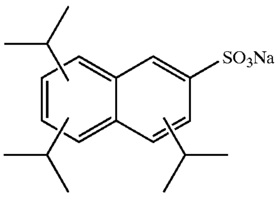

SF-2 $CF_3(CF_2)_7SO_3Na$

Stabilizer St-1

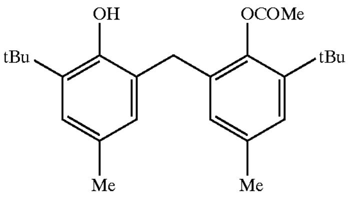

-continued

Coating structure

Stabilizer St-2

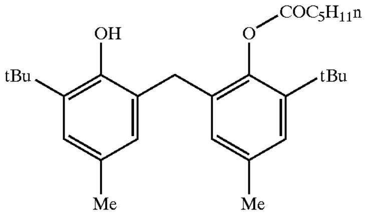

Stabilizer St-3

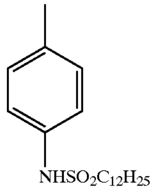

Stabilizer St-4

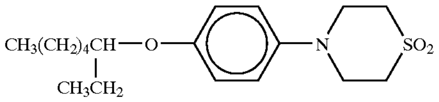

Stabilizer St-5

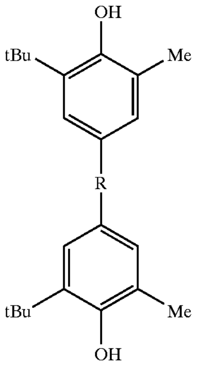

R =

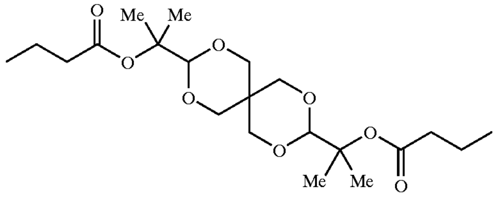

St-6 Irganox 1076 ®

Solvent CS-1

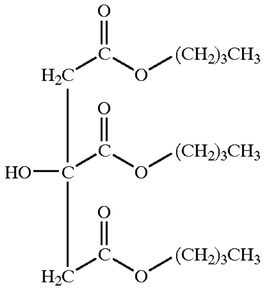

-continued

| | Coating structure |
|---|---|
| Solvent CS-2 | 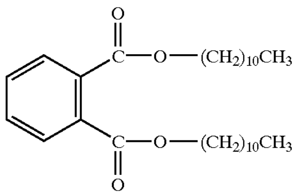 |
| Solvent CS-3 | 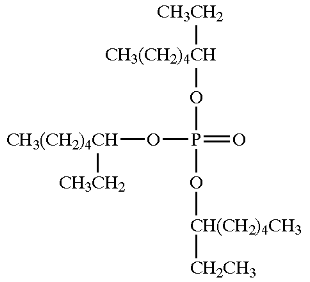 |
| Solvent CS-4 | 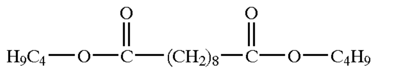 |
| Solvent CS-5 | $CH_3(CH_2)_7CH{=}CH(CH_2)_8{-}OH$ |
| CS-6 | Tritolyl phosphate |
| Coupler YC-1 | 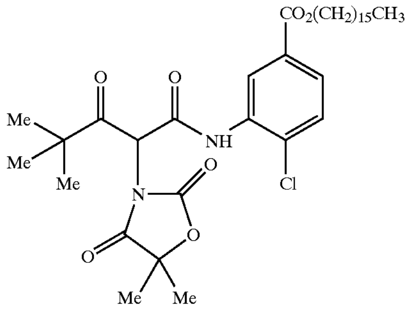 |
| Coupler MC-1 | 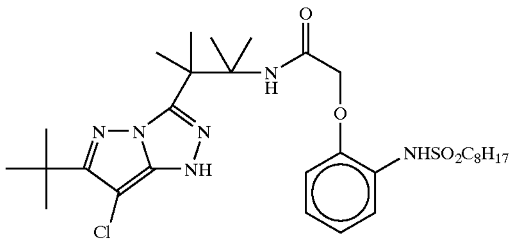 |
| Coupler CC-1 | 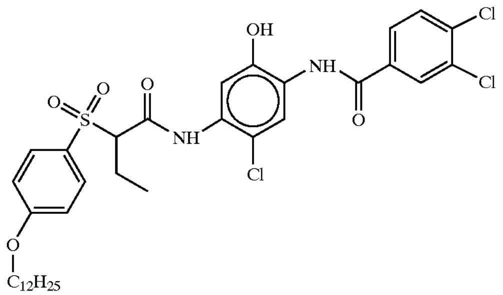 |

Multi layer samples were exposed for 0.5 second to simulate exposure through a color negative film. 0–3.0 density step tablet was used and the source of white light was a Kodak Model 1B sensitometer with a color temperature of 3000° K. and with a combination of the appropriate filters. The samples were also exposed through blue laser exposing device using Argon Ion (multiline) laser at 467.5 nm at a resolution of 196.8 pixels/cm and a pixel pitch of 50.8 $\mu$m, and the exposure time of 1 microsecond per pixel. Digital Reciprocity was then calculated as a difference between shoulder density at laser exposure and that of optical exposure. Thus the more positive Digital reciprocity is, the better emulsion for short duration exposures can be prepared.

The exposed coatings were processed using Kodak™ Ektacolor RA-4 processing. Short Term Latent Image Keeping (SLIK) was be measured by deviations of photographic speed during the time interval between exposure and processing of the film. Time range is 15 sec to 5 mins. The optimum position is zero, so an absolute number can characterize either positive or negative deviations. The smaller the number the better latent image stability is.

TABLE 1

| Ex. | Ir Dopant Level (mg/ Ag mole) | Dopant Location (% band) | Sensitization pH | Digital Reciprocity | SLIK (absolute deviation) | Effect |
|---|---|---|---|---|---|---|
| 1 | 0.054 | 85–88.4 | 5.25 | −0.042 | 0.040 | Comp. |
| 2 | 0.054 | 85–88.4 | 6.6 | +0.025 | 0.009 | Inv. |
| 3 | 0.072 | 85–88.4 | 5.25 | −0.024 | 0.042 | Comp. |
| 4 | 0.072 | 85–88.4 | 6.6 | +0.057 | 0.028 | Inv. |
| 5 | 0.036 | 87.5–89.5 | 5.25 | −0.100 | 0.024 | Comp. |
| 6 | 0.036 | 87.5–89.5 | 6.6 | −0.039 | 0.005 | Inv. |
| 7 | 0.054 | 87.5–89.5 | 5.25 | −0.086 | 0.029 | Comp. |
| 8 | 0.054 | 87.5–89.5 | 6.6 | −0.007 | 0.007 | Inv. |

Examples 2, 4, 6, and 8 in accordance with the invention demonstrate significantly improved short term latent image keeping performance, in addition to desired digital reciprocity, relative to performance for comparison Examples 1, 3, 5 and 7.

EXAMPLES 9–12

Example 9 (comparison): Emulsion in this example was precipitated as in Example 3. A portion of this silver iodochloride emulsion was optimally sensitized as in Example 3, except that emulsion pH was adjusted to 5.50 prior to sensitization.

Example 10 (invention): Emulsion in this example was precipitated as in Example 3. A portion of this silver iodochloride emulsion was optimally sensitized as in Example 3, except that emulsion pH was adjusted to 5.75 prior to sensitization.

Example 11 (invention): Emulsion in this example was precipitated as in Example 3. A portion of this silver iodochloride emulsion was optimally sensitized as in Example 3, except that emulsion pH was adjusted to 6.00 prior to sensitization.

Example 12 (invention): Emulsion in this example was precipitated as in Example 3. A portion of this silver iodochloride emulsion was optimally sensitized as in Example 3, except that emulsion pH was adjusted to 6.25 prior to sensitization.

Emulsions from Examples 9 through 12 were coated, exposed, processed and characterized in a manner identical as those from Examples 1 through 8.

TABLE 2

| Example | Sensitization pH | Digital Reciprocity | SLIK (absolute deviation) | Effect |
|---|---|---|---|---|
| 9 | 5.50 | −0.037 | 0.025 | Comp. |
| 10 | 5.75 | −0.025 | 0.015 | Inv. |
| 11 | 6.00 | −0.007 | 0.001 | Inv. |
| 12 | 6.25 | +0.016 | 0.018 | Inv. |

Examples 10–12 in accordance with the invention demonstrate improved short term latent image keeping performance, in addition to desired digital reciprocity improvement, relative to performance for comparison Example 9. Examples 11–12 in accordance with preferred embodiments of the invention demonstrate especially good combined reciprocity and latent image keeping performance.

EXAMPLES 13–16

Example 13 (comparison): To a reactor incorporating a stirring device as disclosed in *Research Disclosure*, Item 38213, and containing 8.84 kg of distilled water, 25 mg of p-glutaramidophenyl disulfide and 250 g of bone gelatin, were added 291 g of 3.8 M sodium chloride salt solution such that the mixture was maintained at a pCl of about 1.05 at approximately 68° C. To this were added 1.9 of 1,8-dihydroxy-3,6-dithiaoctane approximately 30 seconds before commencing introduction of silver and chloride salt solutions. Aqueous solutions of about 3.7 M silver nitrate and about 3.8 M sodium chloride were then added by conventional controlled double-jet addition at a constant silver nitrate flow rate of about 232 mL/min for about 1.3 minutes while maintaining pCl constant at about 1.05. Following this nucleation period the rest of silver nitrate and sodium chloride for growth of the 91% of the core grain were delivered with five pulses at the flow rate of about 232 mL/min separated by hold periods. Then both the silver and sodium salt solution pumps were then turned off and about 150 grams of fine silver iodide seed emulsion was dumped to the stirred reaction mixture. The resultant iodochloride emulsion was then grown further by pulsed controlled double-jet addition for about 1.4 minutes by resumed addition of silver and sodium salt solutions at about 223 mL/min at a pCl of about 1.05. In addition, cesium pentachloronitrosylosmate was added at approximately 4 to 70% into the precipitation, potassium hexacyanoruthenate at 75–80%. A silver iodochloride emulsion was thus prepared with 0.6 mole % iodide located at 91.5% of total grain volume. Cubic edge length was 0.56 $\mu$m.

A portion of this silver iodochloride emulsion was titrated until pH reached the value of 5.31, and then optimally sensitized by the addition of p-glutaramidophenyl disulfide followed by the addition of a colloidal suspension of aurous sulfide and heat ramped to 60° C. during which time blue sensitizing dye(Dye 1), potassium hexachloroiridate, Lippmann bromide, and 1-(3-acetamidophenyl)5-mercaptotetrazole were added.

Example 14 (comparison): Emulsion in this example was precipitated and optimally sensitized as in Example 13, except that emulsion pH was adjusted to 6.15 prior to sensitization.

Example 15 (comparison): Emulsion in this example was precipitated as in Example 13, except iridium pentachloro-5-methylthiazole was added at 85–88.4% band before iodide seeds addition. A portion of this silver iodochloride emulsion was optimally sensitized as in Example 13.

Example 16 (invention): Emulsion in this example was precipitated as in Example 15. A portion of this silver iodochloride emulsion was optimally sensitized as in Example 14.

Emulsions from Examples 13 through 16 were coated, exposed, processed and characterized in a manner identical as those from examples 1 through 8, except they were coated in single emulsion layer format without the green and red emulsions layers and associated interlayers.

TABLE 3

| Ex. | Ir Dopant Level (mg/Ag mole) | Sensitization pH | Digital Reciprocity | SLIK (absolute deviation) | Effect |
|---|---|---|---|---|---|
| 13 | 0.000 | 5.31 | −0.210 | 0.070 | Comp. |
| 14 | 0.000 | 6.15 | −0.123 | 0.102 | Comp. |
| 15 | 0.072 | 5.31 | −0.005 | 0.107 | Comp. |
| 16 | 0.072 | 6.15 | +0.021 | 0.090 | Inv. |

While iridium is added during surface sensitization of each of Examples 13–16 emulsions, Ex. 14 demonstrates that in the absence of iridium dopant being incorporated into the emulsion grain, high pH during chemical sensitization is not acting effectively on improving Digital Reciprocity signal to desired levels and in fact causes deterioration of short term latent image keeping. As demonstrated by Ex. 16, it is only in combination with iridium dopant that Digital Reciprocity is vastly improved at high sensitization pH, while SLIK signal is also improved relative to that obtained at lower sensitization pH.

EXAMPLE 17

To a reactor incorporating a stirring device as disclosed in *Research Disclosure*, Item 38213, and containing 8.921 grams of distilled water, 25 milligrams of p-glutaramidophenyldisulfide and 250 grams of bone gelatin, were added 294 grams of 3.8 M sodium chloride salt solution such that the mixture was maintained at a pCl of about 1.05 at approximately 68° C. To this were added 1.9 grams of 1,8-dihydroxy-3,6-dithiaoctane approximately 30 seconds before commencing introduction of silver and chloride salt solutions. Aqueous solutions of about 3.7 M silver nitrate and about 3.8 M sodium chloride were then added by conventional controlled double-jet addition at a constant silver nitrate flow rate of about 234 milliliters/minute for about 2.0 minutes while maintaining pCl constant at about 1.05. A 3.0 minute rest period followed nucleation. The remainder of the silver nitrate and sodium chloride for growth of 91% of the core of the grain was delivered with three double-jet pulses at the flow rate of about 234 milliliters/minute separated by hold periods. The duration of the pulses were 3.0, 5.0 and 3.0 minutes, respectively. There was a period of rest after each successive pulse. The duration of rests were 3, 3, and 2 minutes, respectively. Both the silver nitrate and sodium chloride solution pumps were then turned off and about 0.8 M potassium iodide solution was added to the stirred reaction mixture over about 0.5 min at a constant flow rate of about 62.5 milliliters/min. Following a 0.5 min rest period, the resultant iodochloride emulsion was then grown further by pulsed controlled double-jet addition for about 1.3 minutes by resumed addition of silver and sodium salt solutions at about 226 mL/min at a pCl of about 1.05. The solution was then held for one minute. The stirring speed of the stirring device was maintained at 2250 revolutions per minute (RPM) during the entire precipitation process. In addition, $Cs_2Os(NO)Cl_5$ was added at approximately 35 to 71%, and a 2 N NaCl solution containing about 0.9 milligrams of $K_2IrCl_5$(5-methylthiazole) was added at 85–88% of the grain volume. A total of 12.5 moles of a silver iodochloride emulsion was thus prepared with 0.2 mole % iodide added at 91% of total grain volume. Cubic edge length was 0.475 $\mu$m.

Portions of this silver iodochloride emulsion were optimally sensitized, coated, exposed, processed and characterized as in Example 13; except that the pH of the sensitization was varied as described in the table below:

TABLE 4

| Example | Sensitization pH | SLIK | Effect |
|---|---|---|---|
| 17a | 4.75 | 0.097 | Comp. |
| 17b | 5.25 | 0.070 | Comp. |
| 17c | 5.75 | 0.051 | Inv. |
| 17d | 6.25 | 0.010 | Inv. |
| 17e | 6.75 | 0.040 | Inv. |

It is clearly shown above that the short-term stability of the emulsion is greatly improved at sensitization pH values of at least 5.75, and in particular for pH values of greater than 6.0.

EXAMPLE 18

Emulsions for this example were prepared as described in Example 17 with the exception of the dopants added during precipitation. $K_2IrCl_5$(5-methylthiazole) dopant amounts were varied and $K_4Ru(CN)_6$ was added during 75–80% of precipitation in some examples.

TABLE 5

| Ex. | $K_4Ru(CN)_6$ mg/mole | $K_2IrCl_5$(5-methylthiazole) mg/mole | Sensitization pH | SLIK | Effect |
|---|---|---|---|---|---|
| 18a | 0 | 0 | 5.25 | 0.024 | Comp. |
| 18b | 0 | 0 | 6.0 | 0.021 | Comp. |
| 18c | 1.6 | 0.072 | 5.25 | 0.057 | Comp. |
| 18d | 1.6 | 0.072 | 6.0 | 0.015 | Inv. |
| 18e | 1.6 | 0.144 | 5.25 | 0.063 | Comp. |
| 18f | 1.6 | 0.144 | 6.0 | 0.048 | Inv. |
| 18g | 4.8 | 0.036 | 5.25 | 0.150 | Comp. |
| 18h | 4.8 | 0.036 | 6.0 | 0.033 | Inv. |
| 18i | 4.8 | 0.072 | 5.25 | 0.060 | Comp. |
| 18j | 4.8 | 0.072 | 6.0 | 0.000 | Inv. |

The above results indicate that the SLIK instability is largely a result of the addition of the $K_2IrCl_5$(5-methylthiazole) dopant, the presence of which is beneficial in reducing Digital Reciprocity Failure. The use of a higher sensitization pH in accordance with the invention reduces the STIK instability in all cases, and in some instances eliminates it.

EXAMPLES 19–21

Emulsion A

A reaction vessel contained 6.92 L of a solution that was 3.8% in regular gelatin and contained 1.71 g of a Pluronic antifoam agent. To this stirred solution at 46° C. 83.5 mL of 3.0 M NaCl was dumped, and soon after 28.3 mL of dithiaoctanediol solution was poured into the reactor. A half minute after addition of dithiaoctanediol solution, 104.5 mL of a 2.8 M $AgNO_3$ solution and 107.5 mL of 3.0 M NaCl were added simultaneously at 209 mL/min for 0.5 minute. The vAg set point was chosen equal to that observed in the reactor at this time. Then the 2.8 M silver nitrate solution and the 3.0 M sodium chloride solution were added simultaneously with a constant flow at 209 mL/min over 20.75 minutes. During precipitation 0.75 micrograms per silver mole of $Cs_2$(II)Os[NO]$Cl_5$ was added during to 5 to 70% of grain formation, 16.54 milligrams per silver mole of $K_4$Ru (CN)6 was added during precipitation during to 80 to 85% of grain formation, and 1.80 milligrams per silver mole of $K_2IrCl_5$ (5-Methyl-Thiazole) was added during to 90 to 95% of grain formation. The resulting silver chloride emulsion had a cubic shape that was 0.38 $\mu$m in edgelength. The emulsion was then washed using an ultrafiltration unit, and its final pH and pCl were adjusted to 5.6 and 1.8, respectively.

Emulsion B

Emulsion B was precipitated exactly as Emulsion A except that during precipitation 3.0 micrograms per silver mole of $Cs_2$(II)Os[NO]$Cl_5$ was added during to 65 to 70% of grain formation Portions of Emulsions A and B were each optimally sensitized by the customary techniques using the sensitization schemes described below.

In red-sensitized emulsions the following red Spectral Sensitizing Dye A was used:

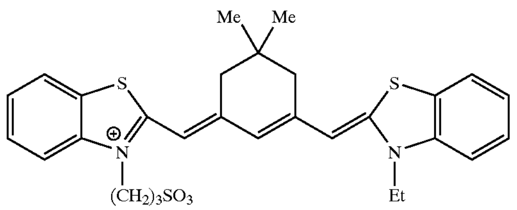

Just prior to coating on resin coated paper support red-sensitized emulsions were dual-mixed with cyan dye forming Coupler A:

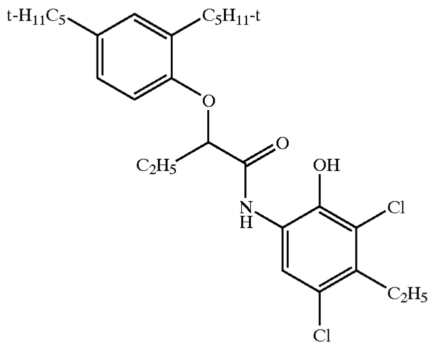

In green-sensitized emulsions the following green Spectral Sensitizing Dye B was used:

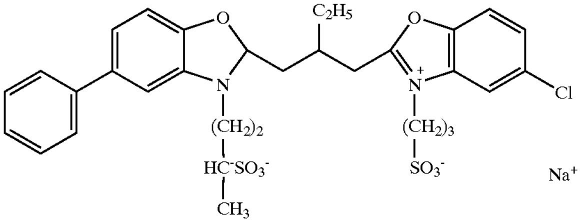

Just prior to coating on resin coated paper support green-sensitized emulsions were dual-mixed with magenta dye forming Coupler B:

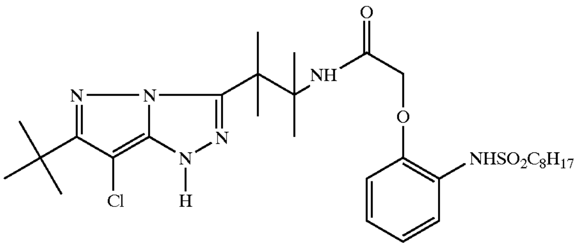

The red sensitized emulsions were coated at 194 mg silver per square meter while green sensitized emulsions were coated at 116 mg silver per square meter on resign-coated paper support. The coatings were overcoated with gelatin layer and the entire coating was hardened with bis (vinylsulfonylmethyl)ether.

Coatings were exposed with Toshiba TOLD 9140™ exposure apparatus at 532 nm (magenta emulsion) or at 691 nm (cyan emulsion), a resolution of 176.8 pixels/cm, a pixel pitch of 42.47 $\mu$m, and the exposure time of 1 microsecond per pixel. All coatings were processed in Kodak™ Ektacolor RA-4. Relative speeds were reported at density level equal to 0.80.

EXAMPLE 19

This example compares effects of pH on laser LIK instability. In each case, silver chloride cubic emulsions sensitized for red color record were used. The sensitization details are as follows:

Part 19.1: A portion of silver chloride Emulsion A was optimally sensitized by the addition of p-glutaramidophenyl disulfide (GDPD) followed by the optimum amount of hypo followed by addition of gold(I). The emulsion was then heated to 65° C. and held at this temperature for 30 minutes with subsequent addition of 1-(3-acetamidophenyl)-5-mercaptotetrazole followed by addition of potassium bromide. Then the emulsion was cooled to 40° C. and followed by addition of Spectral Sensitizing dye A. Prior to the sensitization, emulsion's pH was adjusted to 4.3.

Part 19.2: A portion of silver chloride Emulsion A was sensitized exactly as in Part 19.1 except that the initial pH was set up at 6.6.

All coatings were tested for laser Latent Image Keeping (LIK) stability by varying the time interval between exposure and processing from 20 sec to 2 minutes, as well as from 20 sec to 2 hours. The laser LIK stability data is shown in Table 6.

TABLE 6

| | | Laser LIK | | | |
|---|---|---|---|---|---|
| | | 20 sec to 2 min | | 20 sec to 2 hr | |
| Part | pH | ΔDensity @ SPEED | ΔDensity @ SPEED + 0.15 logE | ΔDensity @ SPEED | ΔDensity @ SPEED + 0.15 logE |
| 19.1 | 4.3 | 0.0179 | 0.0464 | 0.0392 | 0.0733 |
| 19.2 | 6.6 | 0.0107 | 0.0178 | 0.0321 | 0.0429 |

It is evident from Table 6 that an increase in pH during sensitization of AgCl grain sensitized for cyan record produces less laser latent image keeping instability.

EXAMPLE 20

This example compares effects of pH on laser LIK instability. In each case, silver chloride cubic emulsions sensitized for red color record were used. The sensitization details are as follows:

Part 20.1: A portion of silver chloride Emulsion B was optimally sensitized by the addition of p-glutaramidophenyl disulfide (GDPD) followed by the optimum amount of hypo followed by addition of gold(I). The emulsion was then heated to 65° C. and held at this temperature for 30 minutes with subsequent addition of 1-3-acetamidophenyl)-5-mercaptotetrazole. The emulsion was then cooled to 55° C. followed by addition of potassium bromide followed by addition of Spectral Sensitizing dye A. Then the emulsion was cooled to 40° C. Prior to the sensitization, emulsion's pH was adjusted to 4.3.

Part 20.2: A portion of silver chloride Emulsion B was sensitized exactly as in Part 20.1 except that initial pH was set up to 6.1.

The laser LIK stability data is shown in Table 7

TABLE 7

| | | Laser LIK | | | |
|---|---|---|---|---|---|
| | | 20 sec to 2 min | | 20 sec to 2 hr | |
| Part | pH | ΔDensity @ SPEED | ΔDensity @ SPEED + 0.15 logE | ΔDensity @ SPEED | ΔDensity @ SPEED + 0.15 logE |
| 20.1 | 4.3 | 0.0498 | 0.0893 | 0.0607 | 0.0964 |
| 20.2 | 6.1 | — | — | 0.0179 | 0.0250 |

It is evident from Table 7 that an increase in pH during sensitization of AgCl grain sensitized for cyan record produces less laser latent image keeping instability.

EXAMPLE 21

This example compares effects of pH on laser LIK instability. In each case, silver chloride cubic emulsions sensitized for green color record were used. The sensitization details are as follows:

Part 21.1: A portion of silver chloride Emulsion B was optimally sensitized by the addition of green sensitizing dye B followed by addition of a colloidal suspension of aurous sulfide and heat ramped to 55° C., during which time Lippmann silver bromide doped with potassium hexachloroiridate and 1-(3-acetamidophenyl)-5-mercaptotetrazole were added. Prior to the sensitization, emulsion's pH was adjusted to 5.0

Part 21.2: A portion of silver chloride Emulsion B was sensitized exactly as in Part 21.1 except that the initial pH was set up at 5.6.

Part 21.3: A portion of silver chloride Emulsion B was sensitized exactly as in Part 21.1 except that the initial pH was set up at 6.2.

Part 21.4: A portion of silver chloride Emulsion B was sensitized exactly as in Part 21.1 except that the initial pH was set up at 6.8.

Part 21.5: A portion of silver chloride Emulsion B was sensitized exactly as in Part 21.1 except that the initial pH was set up at 7.4.

The laser LIK stability data is shown in Table 8.

TABLE 8

| | | Laser LIK | | | |
|---|---|---|---|---|---|
| | | 20 sec to 2 min | | 20 sec to 2 hr | |
| Part | pH | ΔDensity @ SPEED | ΔDensity @ SPEED + 0.15 logE | ΔDensity @ SPEED | ΔDensity @ SPEED + 0.15 logE |
| 21.1 | 5.0 | 0.1001 | 0.0464 | 0.0392 | 0.0733 |
| 21.2 | 5.6 | 0.1064 | 0.3328 | 0.3429 | 0.6286 |
| 21.3 | 6.2 | 0.0938 | 0.2001 | 0.3004 | 0.5143 |
| 21.4 | 6.8 | 0.0786 | 0.1929 | 0.2357 | 0.4429 |
| 21.5 | 7.4 | 0.0757 | 0.0868 | 0.1429 | 0.2571 |

It is evident from Table 8 that an increase in pH during sensitization of AgCl grain sensitized for red record produces less laser latent image keeping instability.

What is claimed is:

1. A method for forming a radiation-sensitive high chloride silver halide emulsion comprising growing cubical silver halide grains having a central portion accounting for up to 98 percent of total silver of the grains which central portion contains an iridium coordination complex dopant, and chemically sensitizing the surface of the emulsion grains at a pH of at least 5.75.

2. A method according to claim 1, wherein the iridium coordination complex dopant contained in the central portion of the grains is of the formula:

$$[IrL_6]^n$$

wherein n is zero, −1, −2, −3 or −4; and $L_6$ represents six bridging ligands which can be independently selected, provided that at least four of the ligands are anionic ligands.

3. A method according to claim 2 wherein at least one of the ligands of the dopant is a halide ligand.

4. A method according to claim 2 wherein at least four of the ligands of the dopant are halide ligands.

5. A method according to claim 2 wherein at least one of the ligands of the dopant is a chloride ligand.

6. A method according to claim 2 wherein at least four of the ligands of the dopant are chloride ligands.

7. A method according to claim 2 wherein and at least one of the ligands of the dopant comprises a thiazole or substituted thiazole ligand.

8. A method according to claim 7 wherein the dopant is a hexacoordination complex containing a thiazole or substituted thiazole ligand and five halide ligands.

9. A method according to claim 2, wherein each of the ligands is more electropositive than a cyano ligand.

10. A method according to claim 1, wherein the silver halide grains formed contain at least 70 mole percent chloride, based on silver.

11. A method according to claim 10, wherein the silver halide grains formed contain at least 90 mole percent chloride, based on silver.

12. A method according to claim 11, wherein the cubical silver halide grains formed contain from 0.05 to 3 mole percent iodide, based on total silver, wherein (i) the iodide is incorporated in the grains in a controlled, non-uniform distribution forming a core containing at least 50 percent of total silver, an iodide free surface shell having a thickness of greater than 50 Å, and a sub-surface shell that contains a maximum iodide concentration, and (ii) the iridium coordination complex dopant is incorporated into the sub-surface shell or into a region of the core extending up to 60% of the total silver into the grain from the sub-surface shell.

13. A method according to claim 12 wherein the iridium dopant is incorporated into the sub-surface shell or into a region of the core extending up to 40% of the total silver into the grain from the sub-surface shell.

14. A method according to claim 12 wherein the iridium dopant is incorporated into the sub-surface shell or into a region of the core extending up to 20% of the total silver into the grain from the sub-surface shell.

15. A method according to claim 12 wherein the iridium dopant is incorporated into a region of the core extending up to 40% of the total silver into the grain from the sub-surface shell.

16. A method according to claim 12 wherein the iridium dopant is incorporated into a region of the core extending up to 20% of the total silver into the grain from the sub-surface shell.

17. A method according to claim 12 wherein the iridium dopant is incorporated into the sub-surface shell.

18. A method according to claim 12 wherein the iridium dopant is incorporated into the sub-surface shell or into a region of the core extending up to 60% of the total silver into the grain from the sub-surface shell at a concentration of from $10^{-10}$ to $10^{-5}$ mole per mole of total silver.

19. A method according to claim 12 wherein the iridium dopant is incorporated into the sub-surface shell or into a region of the core extending up to 60% of the total silver into the grain from the sub-surface shell present at a concentration from $10^{-9}$ to $10^{-6}$ mole per mole total silver.

20. A method according to claim 1, wherein the emulsion is chemically sensitized at a pH of from 5.75 to 9.0.

21. A method according to claim 1, wherein the emulsion is chemically sensitized at a pH of at least 6.0.

22. A method according to claim 1, wherein the emulsion is chemically sensitized at a pH of from 6.0 to 9.0.

23. A radiation-sensitive high chloride silver halide emulsion obtained according to claim 1.

24. A photographic element comprising a support having coated thereon a radiation sensitive emulsion layer comprising a high chloride emulsion obtained according to claim 1.

25. An electronic printing method comprising subjecting a radiation sensitive silver halide emulsion layer of a photographic element according to claim 24 to actinic radiation of at least $10^{-4}$ ergs/cm$^2$ for up to 100$\mu$ seconds duration in a pixel-by-pixel mode.

26. A method according to claim 25 wherein the exposure is up to 10 microseconds.

27. A method according to claim 25 wherein the duration of the exposure is up to 0.5 microseconds.

28. A method according to claim 25 wherein the duration of the exposure is up to 0.05 microseconds.

29. A method according to claim 25 wherein the source of actinic radiation is a light emitting diode.

30. A method according to claim 25 wherein the source of actinic radiation is a laser.

* * * * *